United States Patent
Wu et al.

(10) Patent No.: US 8,599,560 B2
(45) Date of Patent: Dec. 3, 2013

(54) HEAT DISSIPATING SYSTEM

(75) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 312 days.

(21) Appl. No.: 13/207,464

(22) Filed: Aug. 11, 2011

(65) Prior Publication Data

US 2012/0307447 A1 Dec. 6, 2012

(30) Foreign Application Priority Data

Jun. 2, 2011 (CN) .......................... 2011 1 0147634

(51) Int. Cl.
*H05K 7/20* (2006.01)

(52) U.S. Cl.
USPC ............ 361/719; 361/705; 361/708; 361/712; 174/59; 174/252; 174/260; 174/547; 439/620.15

(58) Field of Classification Search
USPC ........ 361/679.46–679.54, 688–697, 701–720
See application file for complete search history.

(56) References Cited

U.S. PATENT DOCUMENTS

| | | | |
|---|---|---|---|
| 7,352,576 B2 * | 4/2008 | McClure ....................... | 361/695 |
| 8,000,096 B2 * | 8/2011 | Nemoz et al. ............ | 361/679.32 |
| 8,451,622 B2 * | 5/2013 | Yu ................. | 361/800 |
| 2002/0122296 A1 * | 9/2002 | Stone et al. ................... | 361/687 |
| 2003/0172669 A1 * | 9/2003 | Tilton et al. .................... | 62/310 |
| 2011/0188815 A1 * | 8/2011 | Blackwell et al. ............. | 385/88 |

\* cited by examiner

*Primary Examiner* — Courtney Smith
(74) *Attorney, Agent, or Firm* — Altis & Wispro Law Group, Inc.

(57) ABSTRACT

A heat dissipating system includes a shell, a main circuit board, at least two heat generating elements, and at least one fan. The shell includes a first sidewall, a second sidewall facing the first sidewall, and a third sidewall connected to the first sidewall and the second sidewall. The at least one fan are arranged on the first sidewall. The second sidewall defines a number of vents. The main circuit board is positioned between the at least one fan and the vents. The heat dissipating system further includes a connection assembly positioned between the first and second circuit boards. The main circuit board includes a first circuit board and a second circuit board. The first circuit board is electrically connected to the second circuit board through the connection assembly. The at least two heat generating elements are respectively positioned on the first circuit board and the second circuit board.

8 Claims, 3 Drawing Sheets

HEAT DISSIPATING SYSTEM

BACKGROUND

1. Technical Field

The present disclosure relates to a heat dissipating system.

2. Description of Related Art

With the fast development of computer technology, computer hosts are made smaller, but advanced central processing units (CPUs) and memory chips operate increasingly faster, and thereby generate increasingly more heat. As such, more effective heat dissipation of computer hosts is much needed.

Therefore, it is desirable to provide a heat dissipating system, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
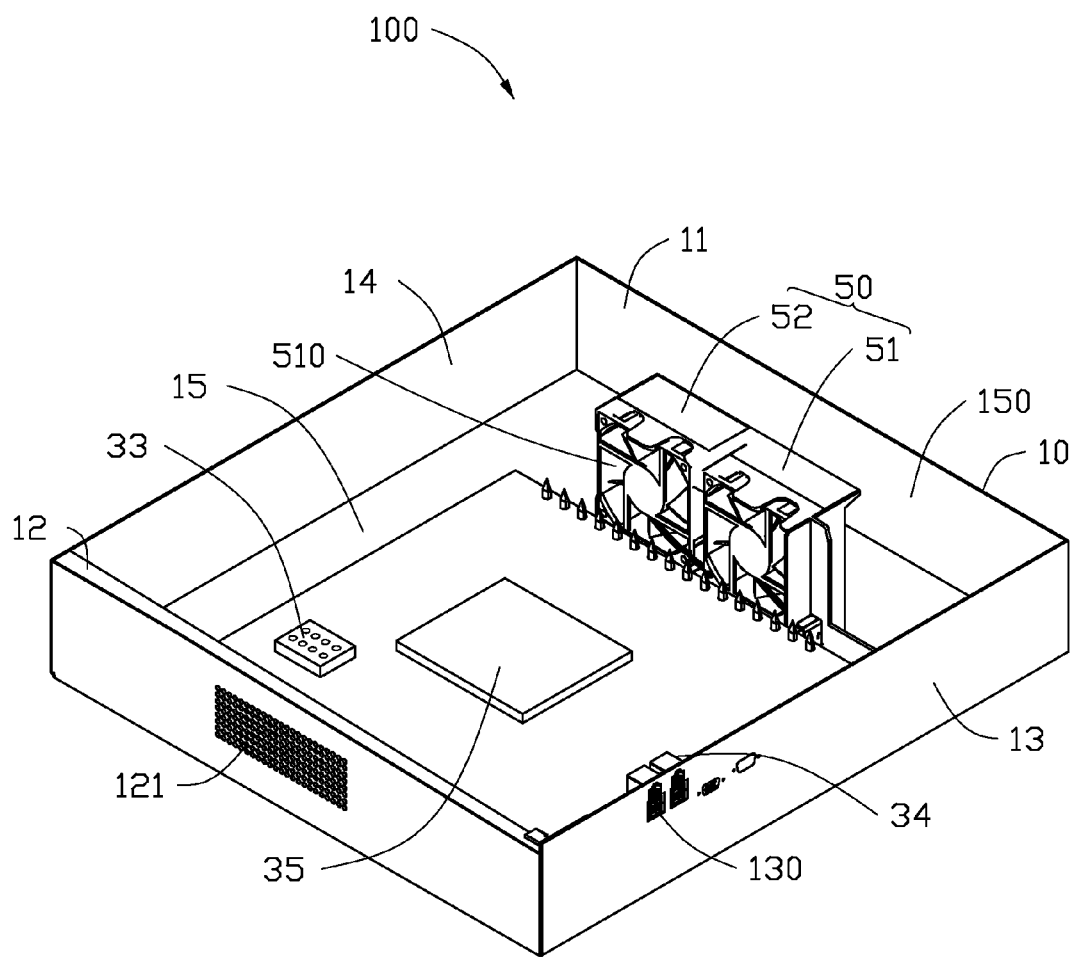
FIG. 1 is an assembled, isometric view of a heat dissipating system, according to a first embodiment.
Figure 2:
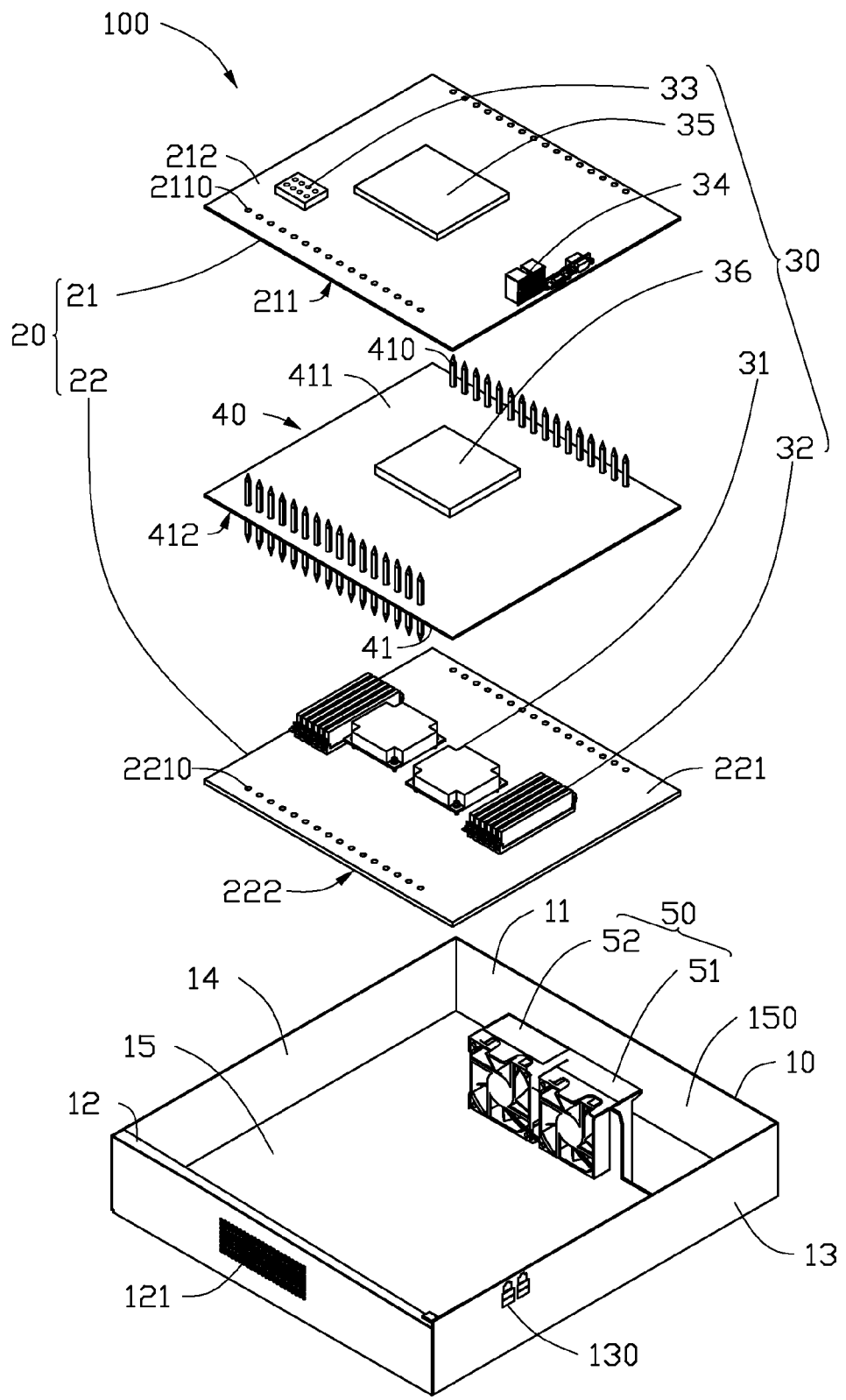
FIG. 2 is an exploded, isometric view of the heat dissipating system of FIG. 1.

Referring to FIGS. 1-2, a heat dissipating system 100, according to a first embodiment, includes a shell 10, a main circuit board 20, at least two heat generating elements 30, a connection assembly 40, and at least one fan 50. The main circuit board 20, the at least two heat generating elements 30, the connection assembly 40, and the at least one fan 50 are all received in the shell 10.

The shell 10 is substantially cuboid-shaped and includes a first sidewall 11, a second sidewall 12 facing the first sidewall 11, a third sidewall 13 perpendicular to and adjacent to both the first sidewall 11 and the second sidewall 12, a fourth sidewall 14 perpendicular to and adjacent to both the first sidewall 11 and the second sidewall 12, and a support board 15 supporting and connecting the first sidewall 11, the second sidewall 12, the third sidewall 13, and the fourth sidewall 14. The third sidewall 13 faces the fourth sidewall 14. The first sidewall 11, the second sidewall 12, the third sidewall 13, the fourth sidewall 14, and the support board 15 cooperatively form a receiving chamber 150 for receiving the main circuit board 20, the at least two heat generating elements 30, the connection assembly 40, and the at least one fan 50. In the embodiment, the second sidewall 12 defines a number of vents 121 generally at the center thereof. The at least one fan 50 is arranged on the support board 15, aligned with the vents 212 and adjacent to the first sidewall 11.

The main circuit board 20 is positioned between the vents 121 and the at least one fan 50. In the embodiment, the main board 20 includes a first circuit board 21 and a second circuit board 22.

In the embodiment, the connection assembly 40 includes a connection board 41. The connection board 41 is supported on and electrically connected to the second circuit board 22, while the first circuit board 21 is supported on and electrically connected to the connection board 41.

In particular, the connection board 41 includes a top surface 411 facing the first circuit board 21, and a bottom surface 412 facing away from the top surface 411. A number of gold fingers 410 are respectively positioned on both the top surface 411 and the bottom surface 412. The first circuit board 21 includes a first surface 211 facing the top surface 411 and close to the second circuit board 22, and a second surface 212 facing away from the first surface 211. The first circuit board 21 defines a number of first welding holes 2110 passing through the first surface 211 and the second surface 212. The first welding holes 2110 spatially correspond to the gold fingers 410 on the top surface 411. The second circuit board 22 includes a third surface 221 facing the bottom surface 412 of the connection board 41 and close to the first surface 211, and a fourth surface 222 facing away from the third surface 221. The second circuit board 22 defines a number of second welding holes 2210 passing through the third surface 221 and the fourth surface 222. The second welding holes 2210 spatially correspond to the gold fingers 410 on the bottom surface 412. The shape and size of the first welding holes 2110 and the second welding holes 2210 correspond to that of the gold fingers 410. As such, the gold fingers 410 are correspondingly plugged into the first welding holes 2110 and the second welding holes 2210 to electrically connect the first circuit board 21 and the second circuit board 22, while the first circuit board 21 and the connection board 41 are spaced from each other by the gold fingers 410 on the top surface 411, and the second circuit board 22 and the connection board 41 are spaced from each other by the gold fingers 410 on the bottom surface 412.

In the embodiment, the at least two heat generating elements 30 include two CPUs 31, a number of memory chips 32, a socket 33, at least one USB interface 34, a first process chip 35, and a second process chip 36. The two CPUs 31 and the memory chips 32 are arranged side by side on the third surface 222 and electrically connected to the second circuit board 22, and directly face the at least one fan 50 and the vents 121. The at least one USB interface 34 is arranged on a periphery of the second surface 212 close to the third sidewall 13 of the shell 10 and electrically connected to the first circuit board 21. The third sidewall 13 defines at least one opening 130 spatially corresponding to the at least one USB interface 34, and the shape and size of the opening 130 correspond to that of the USB interface 34. The second process chip 36 is arranged on the connection board 41 and electrically connected to the connection board 41.

In the embodiment, the at least one fan 50 includes a first fan 51 and a second fan 52. Both the first fan 51 and the second fan 52 are arranged side by side on the support board 15, aligned with the vents 121 and adjacent to the first sidewall 11. Both the first fan 51 and the second fan 52 respectively define an air outlet 510 facing the second sidewall 12 in alignment with the vents 121, so that an airflow produced by the first fan 51 and the second fan 52 can flow over and around the main circuit board 20, the at least two heat generating elements 30 and the connection assembly 40, then on through the vents 121 with extremely low air resistance thus efficiently carrying heat produced by components of the main circuit board 20, the at least two heat generating elements 30, and the connection assembly 40 away.

It should be noted that the number and the arrangement of the at least one fan 50 are not limited to this embodiment but can be set depending on demands.

Figure 3:
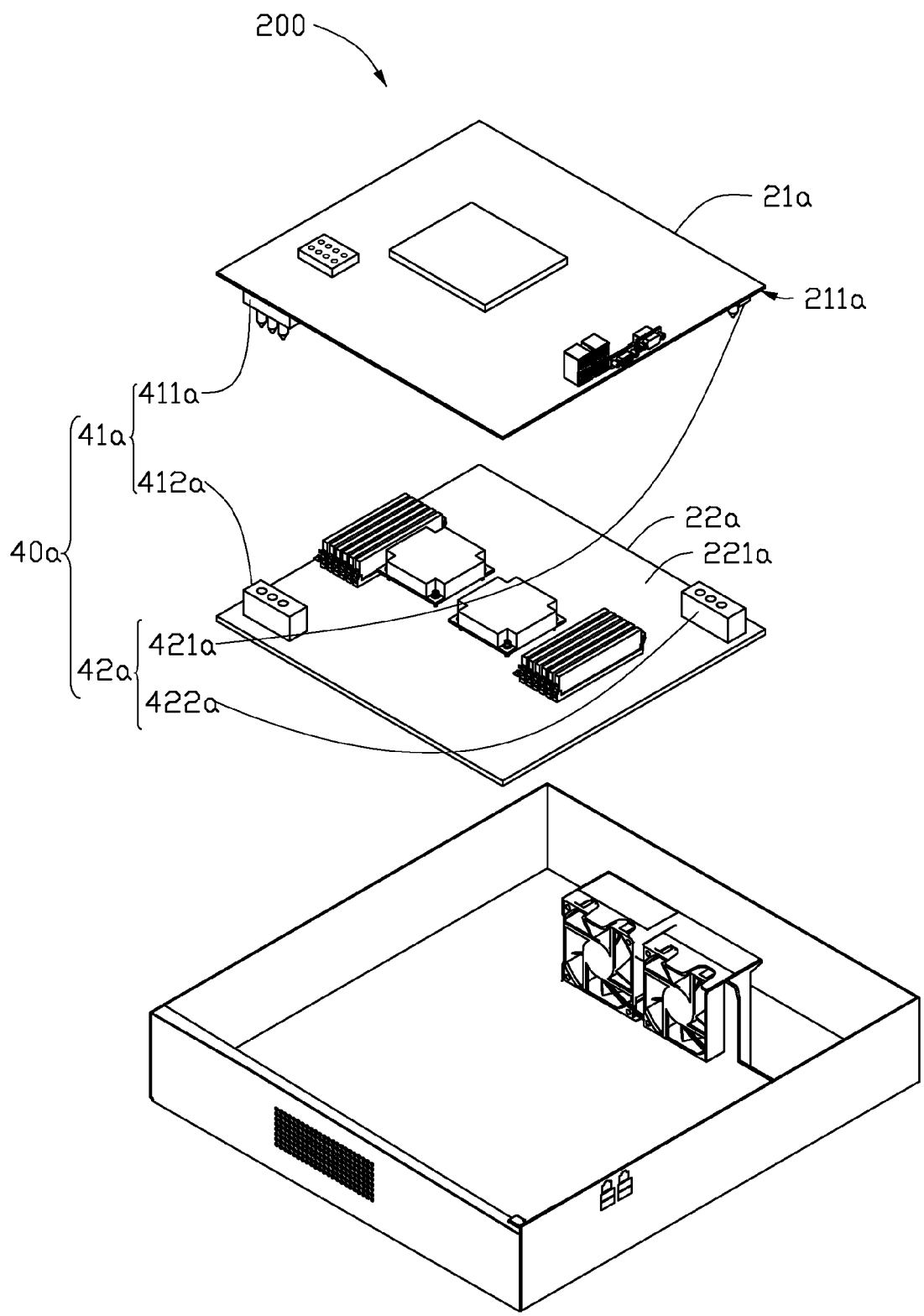
FIG. 3 is an exploded, isometric view of a heat dissipating system, according to a second embodiment.

Referring to FIG. 3, a heat dissipating system 200 in accordance with a second exemplary embodiment is disclosed. The heat dissipating system 200 is essentially similar to the heat dissipating system 100 of the first exemplary embodiment, except for the connection assembly 40a. In the embodiment, the connection assembly 40a includes a first connector 41a and a second connector 42a.

The first connector 41a includes a first male connector 411a and a first female connector 412a. The second connector 42a includes a second male connector 421a and a second female connector 422a. Both the first circuit board 21a and the second circuit board 22a are substantially rectangular-shaped. Both the first male connector 411a and the second male connector 421a are arranged on the first surface 211a of the first circuit board 21a. Both the first female connector 412a and the second female connector 422a are arranged on the third surface 221a of the second circuit board 22a. The first female connector 412a spatially corresponds to and matches with the first male connector 411a, the second female connector 422a spatially corresponds to and matches with the second male connector 421a. As such, the first male connector 411a is plugged into the first female connector 412a, while the second male connector 412a is plugged into the second female connector 422a to electrically connect the first circuit board 21a with the second circuit board 22a. The first circuit board 21a and the second circuit board 22a are spaced from each other by the first connector 41a and the second connector 42a.

The number and the arrangement of the connectors 41a, 42a are not limited to this embodiment but can be set depending on demands, or the second connector 42a can be omitted, both the first circuit board 21a and the second circuit board 22a can be connected to each other only through the first connector 41a.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A heat dissipating system comprising:
   a shell comprising a first sidewall, a second sidewall facing the first sidewall, a third sidewall connected to the first sidewall and the second sidewall, the second sidewall defining a plurality of vents;
   at least one fan arranged adjacent to the first sidewall and spatially corresponding to the vents;
   a main circuit board positioned between the at least one fan and the vents, and comprising a first circuit board and a second circuit board;
   at least two heat generating elements respectively positioned on the first circuit board and the second circuit board; and
   a connection assembly positioned between the first and second circuit boards, the first circuit board electrically connected to the second circuit board through the connection assembly, the first and second circuit boards spaced apart from each other, wherein the first circuit board comprises a first surface close to the second circuit board and a second surface facing away from the first surface, the second circuit board comprises a third surface close to the first circuit board and a fourth surface facing away from the third surface, the connection assembly comprises a connection board comprising a top surface facing the first circuit board, and a bottom surface facing away from the top surface, a plurality of gold fingers are respectively positioned on both the top surface and the bottom surface, the first circuit board defines a plurality of first welding holes passing through the first surface and the second surface, the first welding holes spatially correspond to the gold fingers on the top surface, the second circuit board defines a plurality of second welding holes passing through the third surface and the fourth surface, the second welding holes spatially correspond to the gold fingers on the bottom surface, the gold fingers are correspondingly plugged into the first welding holes and the second welding holes to electrically connected the first circuit board with the second circuit board.

2. The heat dissipating system of claim 1, wherein the shell further comprises a fourth sidewall connected to both the first sidewall and the second sidewall and facing the third sidewall, and a support board supporting and connecting the first sidewall, the second sidewall, the third sidewall, and the fourth sidewall, the first sidewall, the second sidewall, the third sidewall, the fourth sidewall, and the support board cooperatively defines a receiving chamber, the receiving chamber receives the main circuit board, the at least two heat generating elements, the connection assembly, and the at least one fan.

3. The heat dissipating system of claim 2, wherein the at least two heat generating elements respectively positioned on the second surface and the third surface.

4. The heat dissipating system of claim 1, wherein the first circuit board and the connection board are spaced from each other by the gold fingers on the top surface, and the second circuit board and the connection board are spaced from each other by the gold fingers on the bottom surface.

5. The heat dissipating system of claim 1, wherein the shape and size of the first welding holes and the second welding holes correspond to that of the gold fingers.

6. The heat dissipating system of claim 1, the at least two heat generating elements comprise two CPUs, a plurality of memory chips, a socket, and a first process chip, the two CPUs and the memory chips are arranged on the third surface and electrically connected to the second circuit board, and directly face both the at least one fan and the vents, the socket and the first process chip are arranged on and electrically connected to the first circuit board.

7. The heat dissipating system of claim 6, wherein the at least two heat generating elements further comprises a second process chip arranged on and electrically connected to the connection board.

8. The heat dissipating system of claim 6, wherein the at least two heat generating elements further comprises at least one USB interface, the at least one USB interface is arranged on a periphery of the second surface close to the third sidewall of the shell and electrically connected to the first circuit board, the third sidewall defines at least one opening spatially corresponding to the at least one USB interface, and the shape and size of the at least one opening correspond to that of the at least one USB interface.

* * * * *